United States Patent
Kalina

(10) Patent No.: US 8,561,406 B2
(45) Date of Patent: *Oct. 22, 2013

(54) PROCESS AND POWER SYSTEM UTILIZING POTENTIAL OF OCEAN THERMAL ENERGY CONVERSION

(75) Inventor: Alexander I. Kalina, Hillsborough, CA (US)

(73) Assignee: Kalex, LLC, Belmont, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 13/213,322

(22) Filed: Aug. 19, 2011

(65) Prior Publication Data

US 2013/0019597 A1    Jan. 24, 2013

Related U.S. Application Data

(63) Continuation-in-part of application No. 13/188,063, filed on Jul. 21, 2011.

(51) Int. Cl.
*F03G 7/04* (2006.01)
*F03G 7/00* (2006.01)
*F01K 27/00* (2006.01)
*F01K 13/00* (2006.01)
*F01K 25/06* (2006.01)

(52) U.S. Cl.
USPC ............. 60/641.7; 60/641.1; 60/645; 60/649

(58) Field of Classification Search
USPC ..................................................... 60/640–657
See application file for complete search history.

(56) References Cited

U.S. PATENT DOCUMENTS

| | | | |
|---|---|---|---|
| 6,367,258 B1 * | 4/2002 | Wen et al. | 60/641.7 |
| 2007/0068160 A1 * | 3/2007 | Jagusztyn et al. | 60/641.6 |
| 2010/0050636 A1 * | 3/2010 | Ramamurthy | 60/641.7 |
| 2011/0061383 A1 * | 3/2011 | McAlister | 60/641.7 |
| 2011/0173979 A1 * | 7/2011 | Krull et al. | 60/641.7 |

* cited by examiner

*Primary Examiner* — Kenneth Bomberg
*Assistant Examiner* — Deming Wan
(74) *Attorney, Agent, or Firm* — Robert W Strozier

(57) ABSTRACT

Ocean Thermal Energy Conversion (OTEC) systems and methods utilizing the systems are disclosed for producing a useable form of energy utilizing warm surface seawater and cold seawater from depths up to 2 miles below the surface and utilizing a multi-component working fluid. The systems and methods are designed to maximize energy conversion per unit of cold seawater, the limited resource, achieving relative net outputs compared to a Rankine cycle using a single component fluid by at least 20% and even as high as about 55%.

39 Claims, 4 Drawing Sheets

PROCESS AND POWER SYSTEM UTILIZING POTENTIAL OF OCEAN THERMAL ENERGY CONVERSION

RELATED APPLICATIONS

The present application is a continuation-in-part of U.S. patent application Ser. No. 13/188,063 filed 21 Jul. 2011.

BACKGROUND OF THE INVENTION

1. Field of the Invention

Embodiments of the present invention relates to systems and method utilizing with heat sources having very low temperatures.

More specifically, embodiments of the present invention relates to systems and method utilizing with heat sources having very low temperatures, where the very low temperature streams are derived from warm ocean surface water and the systems and methods derive energy potential for Ocean Thermal Energy Conversion (OTEC.)

2. Description of the Related Art

The energy potential of OTEC is the temperature difference of warm surface water and cooler water from deep below the surface. Such an energy source is practically limitless. Warm seawater from the ocean surface is readily available. On the other hand, cooler water from the deep ocean must be pumped to the surface and thus obtaining this cooler water comes with technological effort and costs.

Therefore, a key criterion for effectiveness of an OTEC power system is the specific output of energy per unit of flow of the cooler water, rather than the warm surface water.

Thus, there is a need in the art for efficient and effective systems and methods for extracting energy from ocean sources for OTEC.

SUMMARY OF THE INVENTION

Embodiments of the present invention provide systems for generating electrical and/or mechanical energy, where a rich solution stream and an intermediate solution stream derived from a multi-component working fluid are partially vaporized by warm seawater and a rich solution stream and an intermediate solution stream are fully condensed by cold seawater. The systems include a vessel or a floating platform, where a temperature differential between the warm seawater and the cold seawater is modest—between about 15° C. and about 30° C. The systems include vessel or floating platform on which is mounted and operated a thermal energy conversion subsystem, a warm seawater supply subsystem, a warm seawater discharge subsystem, a cold seawater supply subsystem and a cold seawater discharge subsystem. The thermal energy conversion subsystems comprise a turbine or energy converting unit, a condensing unit, two preheating units, two vaporizing units, and two separating units. The thermal energy conversion system comprises also includes dividing valves, combining valves, throttle control valves, and pumps and piping to interconnect the units and to produce an operable configuration. The thermal energy conversion subsystem uses the warm seawater to partially vaporize a rich solution stream and an intermediate solution stream. The thermal energy conversion subsystem then separates the partially vaporized rich solution into a rich vapor stream that is forwarded to the turbine unit, where a portion of its thermal energy is converted into a useable form of energy (electrical and/or mechanical). The warm seawater supply subsystem includes a collector for collecting warm seawater from the surface of the ocean/sea and pipes to direct the warm seawater to the thermal energy conversion system, while the warm seawater discharge subsystem includes a spent warm seawater discharge and optionally one or more processing units to process the water in case of contamination. The cold seawater supply subsystem includes a collector for collecting cold seawater from a depth between about 0.5 and 1.5 miles below the surface of the ocean/sea and pipes to direct the cold seawater to the thermal energy conversion system, while the cold seawater discharge subsystem includes a spent cold seawater discharge and optionally one or more processing units to process the water in case of contamination.

Embodiments of the present invention provide thermal energy conversion subsystems comprising a turbine or energy converting unit, a condensing unit, two preheating units, two vaporizing units, and two separating units. The thermal energy conversion system comprises also includes dividing valves, combining valves, throttle control valves, and pumps and piping to interconnect the units and to produce an operable configuration. The thermal energy conversion subsystem uses the warm seawater to partially vaporize a rich solution stream and an intermediate solution stream. The thermal energy conversion subsystem then separates the partially vaporized rich solution into a rich vapor stream that is forwarded to the turbine unit, where a portion of its thermal energy is converted into a useable form of energy (electrical and/or mechanical).

Embodiments of the present invention provide methods for producing electrical and/or mechanical energy from a temperature different between warm surface seawater and cold seawater collected at depths up to 2 miles below the surface of an ocean or sea. The methods include passing a first rich vapor stream, which may be pressure adjusted in a second throttle control valve if needed, through a turbine unit, where a portion of thermal energy in the first rich vapor stream is converted to a useable form of energy to produce a spent rich solution stream. The spent rich solution stream is then combined with a cooled second lean liquid stream, which may be pressure adjusted in a third throttle control valve if needed, to form an intermediate solution stream, where the intermediate solution stream is leaner than the rich solution stream. The intermediate solution stream is then fully condensed in a first condenser to form a fully condensed intermediate solution stream utilizing a cold seawater stream. The fully condensed intermediate solution stream is pressurized in a second pump to a higher pressure to form a higher pressure, fully condensed intermediate stream, which is then divided into two substreams. The first higher pressure, fully condensed intermediate substream is combined with a second rich vapor stream to form a rich solution stream. The rich solution stream is then fully condensed in a second condenser to form a fully condensed rich solution stream utilizing a warmed cold seawater stream. The fully condensed rich solution stream is then pumped in a first pump to a higher pressure and forwarded to a preheater, where the higher pressure, fully condensed rich solution stream is preheated utilizing a first cooled warm seawater substream. The preheated higher pressure, rich solution stream is then partially vaporized in a first partial vaporizer unit to from a partially vaporized, rich solution stream and a cooled warm seawater stream, which is divided into the first cooled warm seawater substream and a second cooled warm seawater substream. The partially vaporized, rich solution stream is then forwarded to a first separator to form the first rich vapor stream and a first lean liquid stream. Meanwhile, the second higher pressure, fully condensed intermediate substream is preheated utilizing the a second lean liquid stream to form a preheated, second higher pressure, intermediate substream and the cooled second lean liquid stream. The preheated, second higher pressure, intermediate substream is then partially vaporized in a second partial vaporizer unit to form a partially vaporized, second higher pressure, intermediate substream utilizing the second cooled warm seawater substream. The partially vaporized, second higher pressure, intermediate substream is then combined with the first lean liquid stream, which may be pressure adjusted by a first throttle control valve, if needed, to form a lean solution stream. The lean solution stream is then forwarded to a second separator to form the second rich vapor stream and the second lean liquid stream. The system is closed with respect to the multi-component working fluid.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
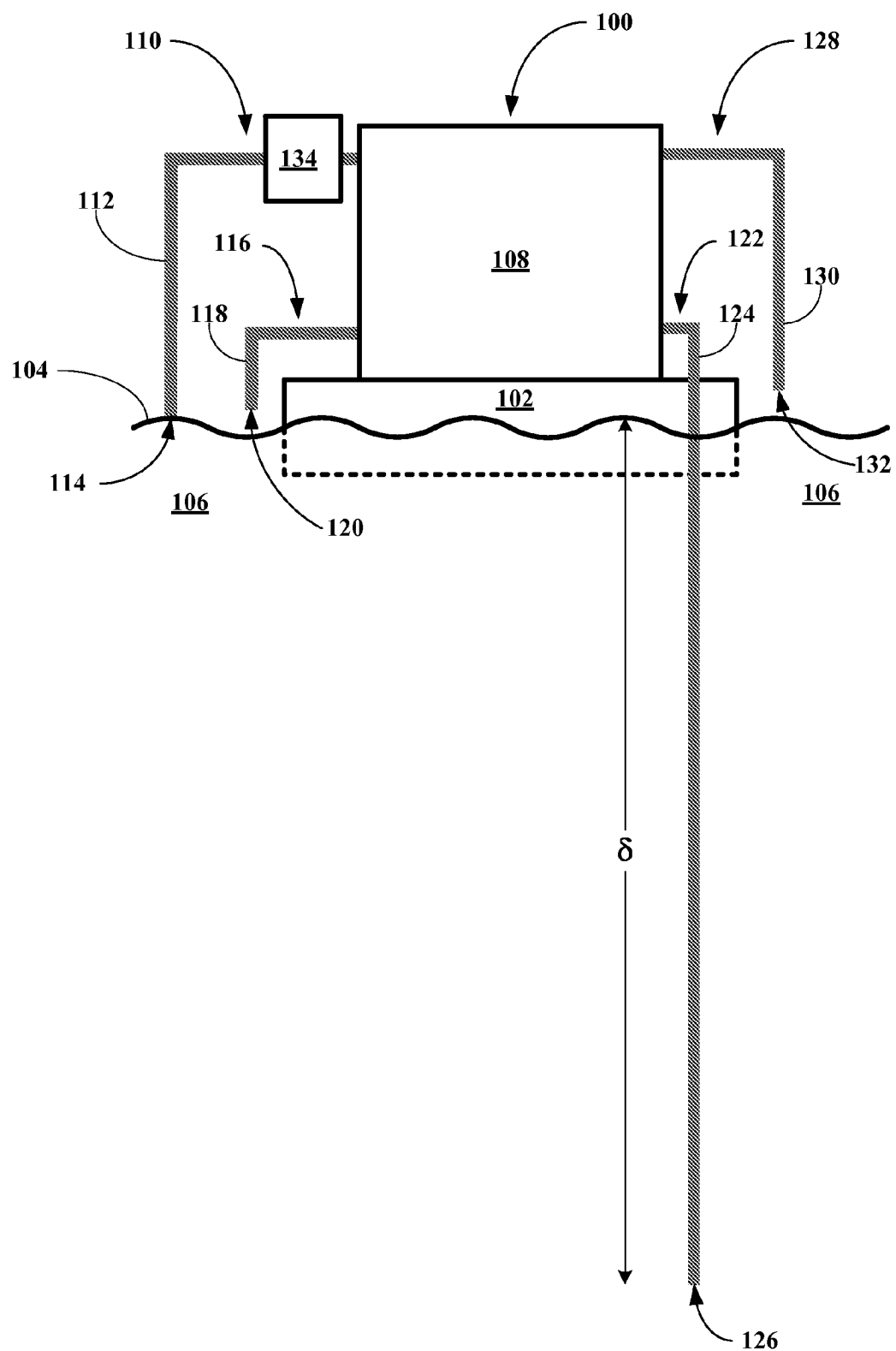
FIG. 1 depicts an embodiment of a ocean based system of this invention, including a floating vessel, warm seawater intake and outlet, cold seawater intake and outlet and a thermal energy conversion subsystem.

The inventor has found that systems and methods can be implemented for deriving useable energy from oceans using very low temperature surface ocean water and cool deep ocean water. The inventor has found that compared to applicable prior art system, the present invention provides a substantial increase in power output per unit of flow rate of cooling water and a substantial reduction in the use of warm seawater per unit of power generated. The inventor has found that the calculated net output of the present invention using a multi-component fluid comprising ammonia and water is improved relative to a Rankine cycle using pure ammonia by at least about 20%. In certain embodiments, the improvement in net output is at least about 25%. In other embodiments, the improvement in net output is at least about 30%. In other embodiments, the improvement in net output is at least about 35%. In other embodiments, the improvement in net output is at least about 40%. In other embodiments, the improvement in net output is at least about 45%. In other embodiments, the improvement in net output is at least about 50%. In other embodiments, the improvement in net output is at least about 55%.

Embodiments of the present system include a vessel or a floating platform. The vessel includes a thermal energy conversion subsystem, a warm seawater supply subsystem, a warm seawater discharge subsystem, a cold seawater supply subsystem and a cold seawater discharge subsystem. The thermal energy conversion subsystem comprises a turbine or energy converting unit, a condensing unit, two preheating units, two vaporizing units, and two separating units. The thermal energy conversion system comprises also includes dividing valves, combining valves, throttle control valves, and pumps and piping to interconnect the units and to produce an operable configuration. The warm seawater supply subsystem includes a collector for collecting warm seawater from the surface of the ocean/sea and pipes to direct the warm seawater to the thermal energy conversion system, while the warm seawater discharge subsystem includes a spent warm seawater discharge and optionally one or more processing units to process the water in case of contamination. The cold seawater supply subsystem includes a collector for collecting cold seawater from a depth between about 0.5 and 1.5 miles below the surface of the ocean/sea and pipes to direct the cold seawater to the thermal energy conversion system, while the cold seawater discharge subsystem includes a spent cold seawater discharge and optionally one or more processing units to process the water in case of contamination.

Embodiments of the present system include thermal energy conversion subsystems comprising a turbine or energy converting unit, two condensing unit, two preheating units, two partial vaporizing units, and two separating units, where the systems utilize warm seawater stream to partially vaporize streams having different compositions of a multi-component working fluid and cold seawater to fully condense streams having different compositions of a multi-component working fluid. The thermal energy conversion system also comprises dividing valves, combining valves, throttle control valves, and pumps and piping to interconnect the units, where the valves, pumps and piping produce an operable configuration.

Embodiments of the present method include collecting warm seawater at or near the surface of an ocean or a sea, and supplying the collected warm seawater to the thermal energy conversion subsystem. In the thermal energy conversion subsystem, the warm seawater stream is pumped to a desired higher pressure. The higher pressure warm seawater is then used to preheat and partially vaporize a higher pressure, rich solution stream and a higher pressure, intermediate solution stream in the preheating and vaporizing units. The spent warm stream is then discharged into the ocean/sea via the warm seawater discharge subsystem. The partially vaporized, higher pressure, rich solution stream is then separated in the first separating unit to form a first lean liquid stream and a first rich vapor stream or energy extraction stream. The first rich vapor stream is then forwarded to the turbine unit, where a portion of its thermal energy is converted into a useable form of energy, forming a spent stream. Optionally, the first rich vapor stream is pressure adjusted prior to being forwarded to the turbine unit. The first lean liquid stream and a partially vaporized, higher pressure intermediate solution substream are combined and forwarded to the second separator unit forming a second lean liquid and a second rich vapor stream. Optionally, the first lean liquid stream is pressure adjusted prior to being combined with the partially vaporized, higher pressure intermediate solution substream. The second rich vapor stream is combined with a first fully condensed, higher pressure intermediate solution substream to form the rich solution stream. The rich solution stream is then fully condensed in a second condensing unit to form a fully condensed, rich solution stream. The fully condensed, rich solution stream is then pumped to a higher pressure to form a fully condensed, higher pressure, rich solution stream. The fully condensed, higher pressure, rich solution stream is then preheated in a first preheating unit with heat from a cooled warm seawater substream to form a preheated, higher pressure, rich solution stream, and then partially vaporized in a first vaporizing unit with heat from the higher pressure, warm seawater stream to form the partially vaporized, higher pressure, rich solution stream and a cooled warm seawater stream. The cooled warm seawater stream is then divided into a first and second higher pressure, cooled warm seawater substreams. The spent steam and a cooled, second lean liquid stream are combined to form an intermediate solution stream. Optionally, the cooled, second lean liquid stream is pressure adjusted prior to be combined with the spend stream. The intermediate solution stream is then condensed in a first condensing unit to form a fully condensed, intermediate solution stream. The fully condensed, intermediate solution stream is then pressurized to form a higher pressure, fully condensed intermediate solution stream. The higher pressure, fully condensed, intermediate solution stream is then split into a first higher pressure, fully condensed, intermediate solution substream and a second higher pressure, fully condensed, intermediate solution substream. The second higher pressure, fully condensed, intermediate solution substream is preheated by the second lean liquid stream to form a preheated, second higher pressure, intermediate solution substream and the cooled second lean liquid stream. The preheated, second higher pressure, intermediate solution substream is then partially vaporized in the second vaporizing unit with heat from a cooled warm seawater substream to form the partially vaporized, second higher pressure, intermediate solution substream and a first spend warm seawater stream. The system is closed with respect to the multi-component working fluid.

The systems also include valves for dividing stream and for mixing stream, throttle control valves for adjusting the pressure of stream and piping needed to implement the methods of this invention. The heat exchange units can be any heat exchanges presently known or that are invented to bring two streams into counterflow heat exchange contact one with the other so that heat can transfer from a higher temperature stream to a lower temperature stream—heating the lower temperature stream and cooling the higher temperature stream. The system can be land based or ocean/sea based depending on access to cold seawater. The term very low temperature means that the warm seawater stream collected for or near the surface of the ocean/sea is between about 20° C. and about 30° C., while the temperature of the cold seawater collected from depth between about 0.5 miles to about 1.5 miles is between about 1° C. and about 10° C. In certain embodiments, the temperature of the warm seawater is between about 21° C. and about 29° C., while the temperature of the cold seawater is between about 2° C. and about 9° C. In certain embodiments, the temperature of the warm seawater is between about 22° C. and about 28° C., while the temperature of the cold seawater is between about 3° C. and about 8° C. In certain embodiments, the temperature of the warm seawater is between about 21° C. and about 29° C., while the temperature of the cold seawater is between about 4° C. and about 8° C. In certain embodiments, sun light may be used to further heat the warm seawater streams so that the temperature of the warm seawater stream may be as high as 85° C.

The working fluids used in the systems and methods of this invention are multi-component fluids that comprise at least one lower boiling point component—the lower boiling component—and at least one higher boiling point component—the higher boiling component. In certain embodiments, the working fluids comprise an ammonia-water mixture, a mixture of two or more hydrocarbons, a mixture of two or more freon, a mixture of hydrocarbons and freon, or the like. In general embodiments, the fluid may comprise mixtures of any number of components with favorable thermodynamic characteristics and solubility. In other embodiments, the fluid comprises a mixture of water and ammonia. Working fluid streams having a high concentration of the lower boiling component are referred to as "rich" working fluid streams and working fluid streams with a lower concentration of the lower boiling component are referred to as "lean" working fluid streams.

DETAILED DESCRIPTION OF THE FIGURES

Referring now to FIG. 1, an embodiment of Ocean Thermal Energy Conversion (OTEC) system of this invention, generally 100, is shown to include a floating vessel 102 floating on a surface 104 of an ocean or sea 106. Mounted on the vessel 102 is a thermal energy conversion subsystem 108. The system 100 also includes a warm seawater intake subsystem 110, shown here as a intake pipe 112 having an end 114 disposed on the surface 104 or below the surface 104 to supply warm seawater to the subsystem 108. The system 100 also includes a warm seawater outlet subsystem 116, shown here simply as a pipe 118 having an end 120 disposed above, at, or below the surface 104 of the ocean or sea 106. The system 100 also includes a cold seawater intake subsystem 122, shown here as a long pipe 124 having an end 126 disposed at a depth δ between about 0.5 and about 1.5 miles below the surface 104 or the ocean or sea 106. In certain embodiments, the end 126 is disposed at a depth δ between about 0.75 and about 1.25 miles below the surface 104. In other embodiments, the end 126 is disposed at a depth δ between about 0.8 and about 1 mile below the surface 104. The system 100 also includes a cold seawater outlet subsystem 128, shown here simply as a pipe 130 having an end 132 disposed above, at, or below the surface 104 of the ocean or sea 106. The outlet subsystems 116 and 128 may include one or more processing steps to insure that the discharged water include no contaminants incurred during energy extraction. The system may also include a solar collection subsystem 134 or other means for heating the warm seawater stream (exhaust from the vessel's engine exhaust system) to raise the temperature of the warm seawater stream before entering the thermal energy conversion subsystem 108.

Figure 2:
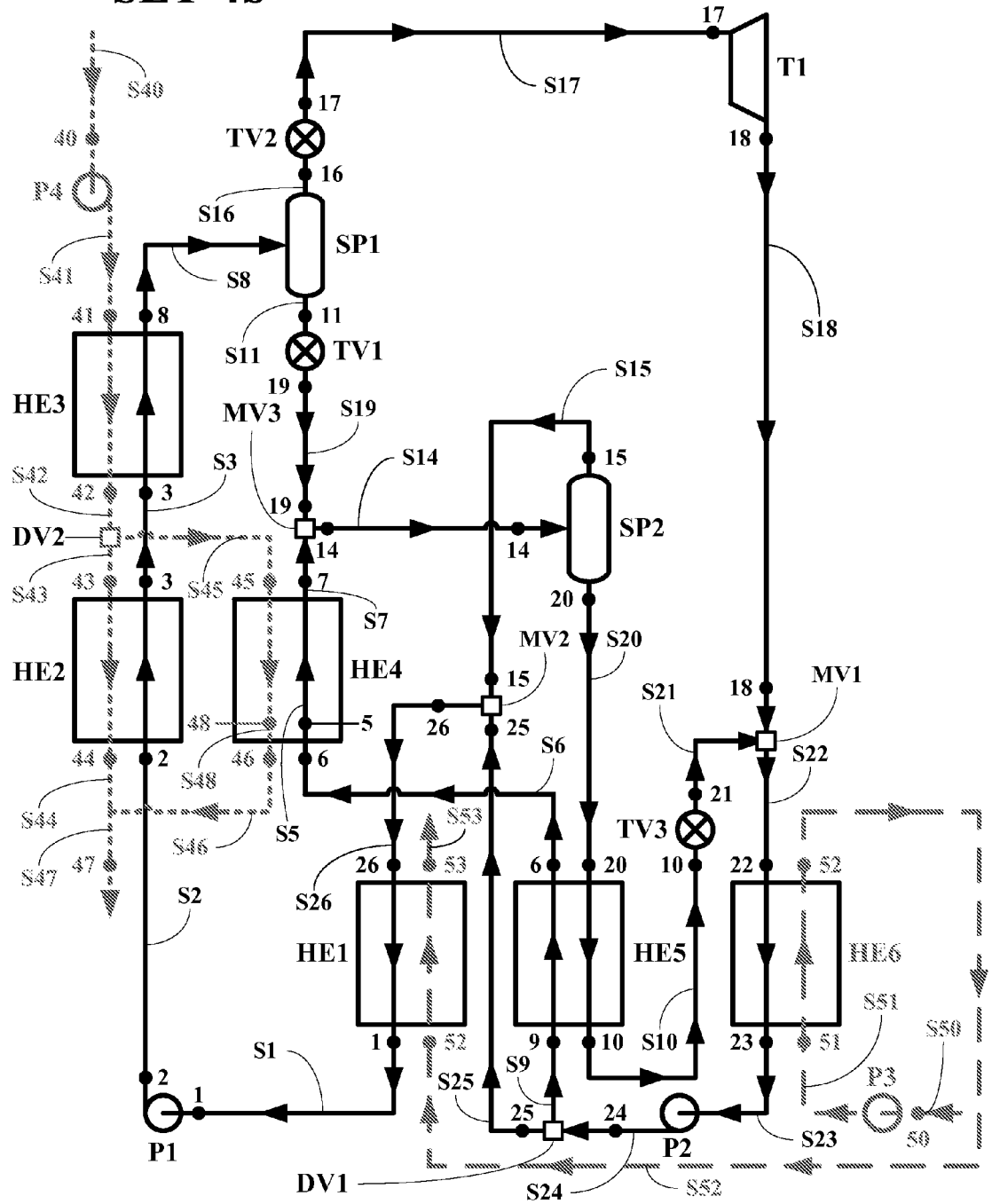
FIG. 2 depicts an embodiment of the thermal energy conversion subsystem of FIG. 1.

Referring now to FIG. 2, an embodiment of an energy conversion subsystem 108 of FIG. 1 and method of implementing the subsystem and how it operates is shown.

A warm seawater stream S40 having parameters as at a point 40 supplied by the warm seawater intake subsystem 110 from the surface 104 of the ocean or sea 106 is pumped by a pump P4, to an elevated pressure to form a higher pressure warm seawater stream S41 having parameters as at a point 41. The higher pressure warm seawater stream S41 is then passes through a third heat exchange unit HE3 in counterflow with a pre-heated, higher pressure, rich solution stream S3 having parameters as at a point 3 to form a partially vaporized, higher pressure, rich solution stream S8 having parameters as at a point 8 and a cooled higher pressure warm seawater stream S42 having parameters as at a point 42. The third heat exchange unit HE3 serves as a boiler for the power system's, higher pressure, rich solution stream S3, where the higher pressure warm seawater stream S40 transfers a portion of its thermal energy to the pre-heated higher pressure, rich solution stream S3 in a third heat exchange process 3-8 or 41-42.

The cooled higher pressure warm seawater stream S42 is now divided in a second dividing valve DV2 into two cooled higher pressure warm seawater substreams S43 and S45 having parameters as at points 43 and 45, respectively.

The cooled higher pressure warm seawater stream S43 now passes through a second heat exchange unit HE2, where it is further cooled, providing heat for preheating of a higher pressure, rich solution stream S2 having parameters as at a point 2 in a second heat exchange process 2-3 or 43-44 as described below to form the spent warm seawater substream S44 having parameters as at a point 44 and the pre-heated, rich solution stream S3.

Meanwhile, the cooled higher pressure warm seawater substream S45 passes through a fourth heat exchange unit HE4, where it is further cooled, providing heat for vaporizing a preheated, pressurized intermediate solution stream S6 having parameters as at a point 6 in a second heat exchange process 6-5-7 or 45-48-46 as described below to form a vaporized, higher pressure rich solution stream S7 having parameters as at a point 7 and a spent warm seawater substream S46 having parameters as at a point 46.

Thereafter, the spent warm seawater streams S46 and S44 are combined to form a combined spent warm seawater stream S47 having parameters as at a point 47, which is then process and/or discharged from the subsystem 108 via the warm seawater outlet subsystem 116.

A fully condensed rich solution stream S1 having parameters as at a point 1, corresponding to a state of saturated or slightly subcooled liquid, enters into a first or feed pump P1, where it is pressurized to a higher pressure to form the higher pressure, rich solution stream S2 having parameters as the point 2, corresponding to a state of subcooled liquid.

Thereafter, the stream S2 passes through the second heat exchange or preheater unit HE2, where it is heated in counterflow with the cooled higher pressure warm seawater substream S43 in the second heat exchange process 43-44 or 2-3 as described above to form the pre-heated rich solution stream S3, corresponding to a state of saturated or slightly subcooled liquid.

Thereafter, the higher pressure, rich solution stream S3 enters into the boiler or third heat exchange unit HE3, where is further heated in counterflow with the higher pressure warm seawater stream S41 in the third heat exchange process 41-42 or 3-8 as described above, where the preheated, higher pressure, rich solution stream S3 is vaporized to form the partially vaporized, higher pressure, rich solution stream S8 having parameters as at the point 8, corresponding to a state of vapor-liquid mixture.

The partially vaporized, higher pressure, rich solution stream S8 is now sent into or forwarded to a first gravity separator SP1, where it is separated into a saturated rich vapor stream S16 having parameters as at a point 16 and a first lean saturated liquid stream S11 having parameters as at a point 11.

The saturated rich vapor stream S16 is now sent through an admission or second throttle control valve TV2, where its pressure is slightly reduced to form a reduced pressure vapor stream S17 having parameters as at a point 17. The reduced pressure vapor stream S17 is then sent into a turbine T1, where it is expanded, producing power, forming a spent stream S18 having parameters as at a point 18, corresponding to a state of wet vapor. A pressure of the spent stream S18 is substantially lower than a pressure of the rich solution stream S1 as described above.

The spent stream S18 is now combined in a first mixing valve MV1 with a cooled, pressure adjusted, second lean liquid stream S21 having parameters as at a point 21, forming a vapor-liquid mixed stream S22 having parameters as at a point 22. The stream S22 is referred to as an intermediate solution, and is substantially leaner than the rich solution stream of the stream S1. The composition of the intermediate solution stream S22 allows the stream S22 to be condensed at substantially lower pressure than the pressure of the stream S1.

The intermediate solution stream S22 is then fully condensed in a low-pressure condenser or sixth heat exchange unit HE6 in counterflow with a pressurized cold seawater stream S51 having parameters as at a point 51 supplied by the cold seawater intake subsystem 122 in a sixth heat exchange process 51-52 or 22-23 as described below. As a result of the sixth heat exchange process 51-52 or 22-23, the intermediate solution stream S22 is converted into a fully condensed intermediate solution stream S23 having parameters as at a point 23 and the pressurized cold seawater stream S51 is converted into a warmed pressurized cold seawater stream S52 having parameters as at a point 52. The fully condensed intermediate solution stream S23, corresponding to a state of saturated liquid. The concentration of lower boiling component, and correspondingly a pressure of condensed intermediate solution stream S23 is substantially lower than at the rich solution stream S1. As a result, the rate of expansion in the turbine T1 is increased, with a corresponding increase in power output.

The fully condensed intermediate solution stream S23 is now sent into a circulating or second pump P2, where its pressure is increased to an intermediate pressure, a pressure slightly higher than the pressure of the rich solution stream S1 to form a pressurized intermediate solution stream S24 having parameters as at a point 24. The pressurized intermediate solution stream S24 corresponds to a state of subcooled liquid.

The pressurized intermediate solution stream S24 is then divided in a first dividing valve DV1 into two pressurized intermediate solution substreams S9 and S25, having parameters as at points 9 and 25.

The pressurized intermediate solution substream S9 is sent into a recuperative preheater or fifth heat exchange unit HE5, where it is heated in counterflow with a second lean liquid stream S20 having parameters as at a point 20 in a sixth heat exchange process 20-10 or 9-6 as described below to form a preheated, pressurized intermediate solution stream S6 having parameters as at a point 6 and a cooled second lean liquid stream S10 having parameters as at a point 10. The preheated, pressurized intermediate solution stream S6 corresponds to a state of saturated or subcooled liquid.

The pressurized intermediate solution substream S6 is now sent into the fourth heat exchange unit HE4, where it is heated in counterflow by the cooled higher pressure warm seawater stream substream S45 in the fourth heat exchange process 45-48-46 or 6-5-7 as described above. The pressurized intermediate solution substream S6 is partially vaporized to form a partially vaporized, pressurized intermediate solution substream S7 having parameters as at point 7. The partially vaporized, pressurized intermediate solution substream S7 corresponds to a state of a vapor-liquid mixture.

At the same time, the first lean saturated liquid stream S11 derived from the first separator SP1 as described above passes through a throttle control valve TV1, where its pressure is reduced to a pressure of the partially vaporized, pressurized intermediate solution substream S7 to form a pressure adjusted mixed vapor-liquid stream S19 having parameters as at a point 19. The mixed stream S19 corresponds to a state of a vapor-liquid mixture.

The streams S7 and S19 are now combined via a third mixing valve MV3 to form a third vapor-liquid mixed stream S14 having parameters as at a point 14.

The third vapor-liquid stream S14 now enters into a second gravity separator SP2, where it is separated into a very rich saturated vapor stream S15 having parameters as at a point 15 as described herein and the second lean saturated liquid stream S20 having the parameters as at the point 20.

The second lean saturated liquid stream S20 is now sent into the fifth heat exchange unit HE5, where it is cooled, providing heat for the fifth heat exchange process 9-6 or 20-10 as described above to form the cooled second lean liquid stream S10.

The cooled second lean liquid stream S10 is then sent through a third throttle control valve TV3, where its pressure is reduced to a pressure equal to a pressure of the spent stream S18 to form the cooled, pressure adjusted, second lean liquid stream S21. The cooled, pressure adjusted, second lean liquid stream S21 is then combined in a first mixing valve MV1 with the spent stream S18 to form the intermediate solution stream S22 as described above.

Meanwhile, the very rich vapor stream S15 is combined in a second mixing valve MV2 with pressurized intermediate solution substreams S25 as described above to form a rich solution or base solution stream S26 having parameters as at a point 26, which corresponds to a state of a vapor-liquid mixture.

The rich solution stream S26 is then sent into a condenser or first heat exchange unit HE1, where it is cooled in counterflow by the warmed pressurized cold seawater stream S52 in a first heat exchange process 52-53 or 26-1 as described below, is fully condensed forming the fully condensed rich solution stream S1 as described above.

The cycle is closed.

A cold seawater stream S50, delivered from deep under the surface of the ocean, having initial parameters as at a point 50, is pumped to a required higher pressure by a water or third pump P3 to form the pressurized cold seawater stream S51 as described above. The pressurized cold seawater stream S51 is then sent into the sixth heat exchange unit HE6, where it cools or absorbs thermal energy from the intermediate solution stream S22 in the sixth heat exchange process 22-23 or 51-52 as described see above to form the warmed pressurized cold seawater stream S52 having parameters as at the point 52.

Thereafter, the warmed pressurized cold seawater stream S52 passes through a first heat exchange unit HE1, providing cooling to or absorbing thermal energy from the rich solution stream S26 in the heat exchange process 26-1 or 52-53 as described above to form the spent cold seawater stream S53 having parameters as at a point 53. The spent stream S53 is then discharged from the subsystem 108 into the cold seawater outlet system 128.

As follows from this description, the cold seawater used as coolant in the condensers HE6 (sixth heat exchange unit) and HE1 (first heat exchange unit) is used consecutively, i.e., the cold seawater stream exiting the condenser HE6 is forwarded to the condenser HE1. The consecutive use of the cold seawater stream S50 in both condensers HE6 and HE1 allows a drastic reduction in the required flow rate of the cooling water per unit of power produced.

The subsystem 108 utilizes a number of streams having different compositions of the lower boiling component(s) and the higher boiling component(s) of a single multi-component working fluid. Streams having a higher concentration of the lower boiling component(s) are referred to as "rich" streams, while streams having a lower concentration of the lower boiling component(s) or a higher concentration of the higher boiling component(s) are referred to as "lean" streams. Table I tabulates the different streams and the points corresponding to the streams as well as indicating the richness or leanness of each composition. Two rich vapor streams are list first in general order of richness, with no concern for which is richer just that they are both richer than the rich solution stream. In a similar manner, the two lean liquid streams produced by the two separating units are ranked as the leanest stream, but one is not ranked leaner than the other as the important thing is the both streams are leaner then the intermediate solution and the lean solution.

TABLE I

Compositions (Rich or Lean) of the Multi-Component Working Fluid for SLT-4b

| Streams | Points | Richness/Leanness |
| --- | --- | --- |
| S16, S17 and S18 | 16, 17 and 18 | first rich vapor |
| S15 | 15 | second rich vapor |
| S26, S1, S2, S3, and S8 | 26, 1, 2, 3 and 8 | rich solution |
| S22, S23, S24, S25, S9, S6, S5 and S7 | 22, 23, 24, 25, 9, 6, 5 and 7 | intermediate solution |
| S14 | 14 | lean solution |
| S11 and S19 | 11 and 19 | first lean liquid |
| S20, S10 and S21 | 20, 10, and 21 | second lean liquid |

Comparing the subsystem 108 of this invention with applicable systems in the prior art, e.g., assorted Rankine cycles, the present subsystem 108 provides a substantial increase in power output per unit of flow rate of cooling water. In addition, the present system also provides a substantial reduction in the use of warm seawater per unit of power generated.

The present systems and method are not intended to maximize efficiency, but to maximum power production per unit of cold seawater as the cold seawater must be produced from deep in the ocean or sea, while the warm seawater supply is unlimited. Because the warm seawater supply is limitless and the cold seawater supply is limited, the circulation of warm seawater through the heat exchanger units HE2, HE3 and HE4 may be increased reducing the size of these heat exchanger units.

The performance of the present subsystem 108, in comparison to the prior art (a Rankine Cycle using a pure ammonia working fluid) is given in Table II, below.

TABLE II

Flow Rates and Net Output and Net Output Increase

| System | Cold Seawater Flow Rate (lb./hour) | Warm Seawater Flow Rate (lb./hour) | Net Output (kW) | Net Output Increase[†] |
| --- | --- | --- | --- | --- |
| Rankine Cycle | 66,666,022 | 110,000,000 | 7,605 | +0% (baseline) |
| SLT-4a | 66,666,022 | 108,002,645 | 11,760 | +54.6% |

[†]Rankine Cycle is baseline.

New Disclosure

In the system designated SLT-4b of FIG. 2, the composition of the rich solution stream S26 having the parameters as at the point 26 was attained by mixing the rich vapor stream S15 having the parameters as at the point 15 coming from the separator SP2 and the intermediate solution liquid stream S25 having the parameters as at the point 25.

In the case that the temperature of the stream S1 drops to a SLT-4c-d temperature, where the SLT-4c-d temperature is characterized when the liquid stream S11 derived from the stream S1 is richer than the intermediate solution stream S25, then an improved result may be achieved if the rich solution stream S26 is formed by mixing the rich vapor stream S15 and a pressure adjusted, first liquid substream S25 derived from the liquid stream S11 exiting the first separator SP1. The use of a portion of the liquid stream S11 to mix with the rich vapor stream S15 produces two new variants of the OTEC system of this invention designated SLT-4c and SLT-4d. SLT-4c is set forth pictorially in FIG. 3 and SLT-4d is set forth pictorially in FIG. 4.

In SLT-4c, the liquid stream S11 is divided in a third dividing valve DV3 into a first substream S12 having parameters as at a point 12 and a second substream S13 having parameters as at a point 13. The first substream S12 contains a majority of the flow of the liquid stream S11, where the majority means an amount greater then 50% of the flow of the stream S11 leaving the first separator SP1.

The first substream S12 is then throttled in the throttle valve TV1, reducing its pressure to the pressure the rich vapor stream S15 having the parameters at the point 15 to form a stream S25 having parameters as at a 25.

The stream S25 is then mixed in the second mixing valve MV2 with the rich vapor stream S15 exiting from the second separator SP2 to form the rich solution stream S26 having the parameters as at the point 26.

Because the stream S25 is richer than the intermediate solution stream S23 having the parameters as at the point 23, the formation of the stream S26 requires a smaller quantity of rich vapor, i.e., the flow of the rich vapor stream S15 may be reduced. This allows a composition of the stream S23 to be leaner than in the system designated SLT-4b of FIG. 2, which in turn, lowers a pressure of the stream S23 having the parameters as at the point 23 and affords a corresponding reduction in a pressure of the spent stream S18 having the parameters as at the point 18. This reduction in the pressure of the spent stream S18 increases an expansion ratio, and an output of the turbine T1.

Meanwhile, the second substream S13 comprising the remaining, minor portion (less than 50% of the flow) of the stream S11 is throttled in a fourth throttle valve TV4, where its pressure is reduced to form a stream S13' having parameters as at a point 13'. The stream S13' is then mixed via a fourth mixing valve MV4 with the liquid S20 to form a stream S20' having the parameters as at a point 20', which is then cooled in the fifth heat exchange unit HE5 to form the stream S10 having the parameters as at the point 10.

Figure 3:
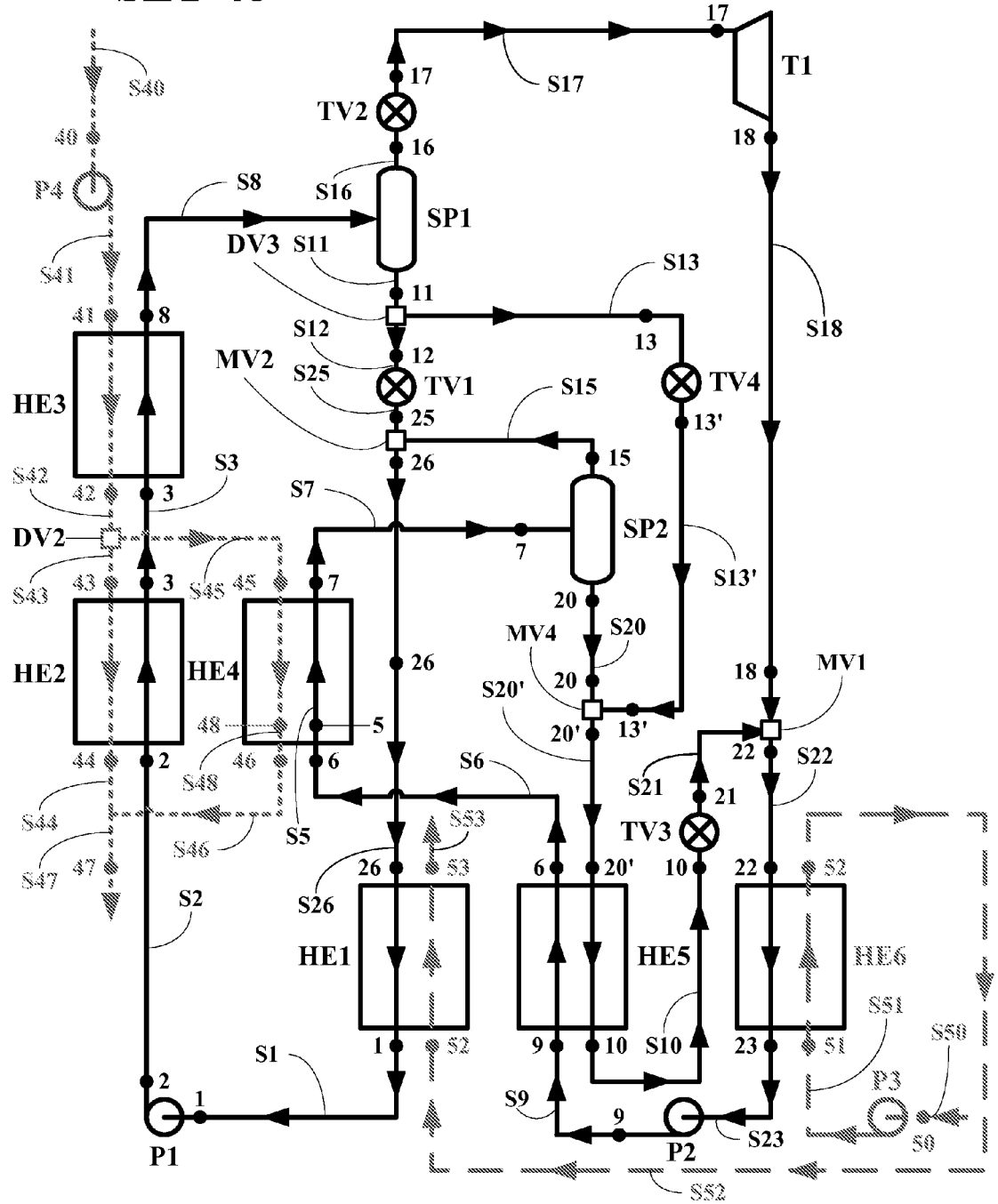
FIG. 3 depicts an embodiment of the thermal energy conversion subsystem of FIG. 1.

From this point forward, the system SLT-4c of FIG. 3 operates as described for SLT-4b pictorially illustrated of FIG. 2.

Figure 4:
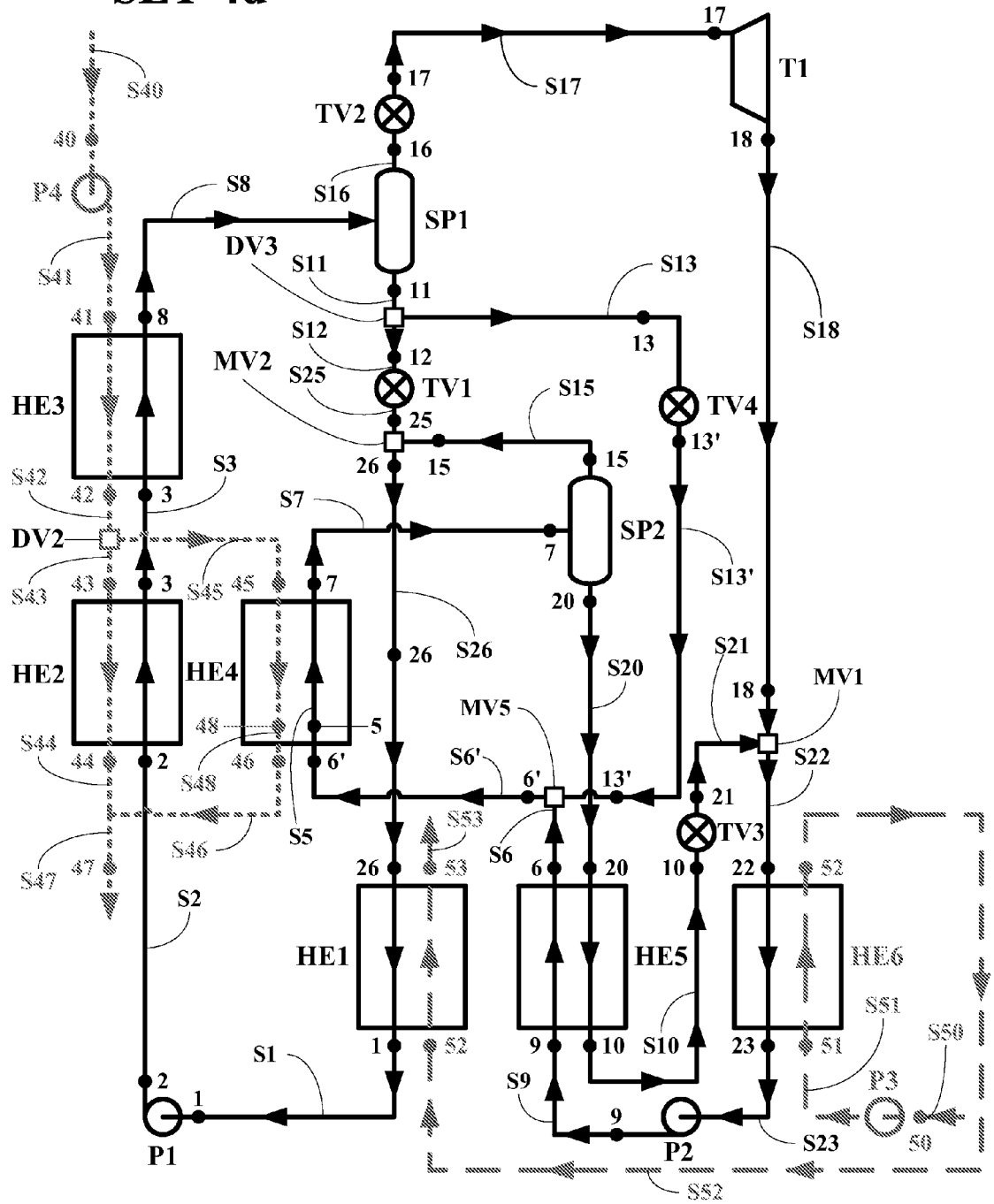
FIG. 4 depicts an embodiment of the thermal energy conversion subsystem of FIG. 1.

The OTEC system designated SLT-4d of FIG. 4 shows an alternative arrangement with even better results. In SLT-4d, the stream S13' is mixed via a fifth mixing valve MV5 with the intermediate solution stream S6 exiting from fifth heat exchange unit HE5 to form a slightly enriched, intermediate solution stream S6' having parameters as at a point 6'.

The stream S6' is then forwarded to the fourth heat exchange unit HE4 for partial vaporization. From this point forward, the system SLT-4d operates as described above for SLT-4c and SLT-4b.

TABLE III

Compositions (Rich or Lean) of the Multi-Component Working Fluid for SLT-4c

| Streams | Points | Richness/Leanness |
|---|---|---|
| S16, S17 and S18 | 16, 17 and 18 | first rich vapor |
| S15 | 15 | second rich vapor |
| S26, S1, S2, S3, and S8 | 26, 1, 2, 3 and 8 | rich solution |
| S22, S23, S24, S9, S6, S5 and S7 | 22, 23, 24, 9, 6, 5 and 7 | intermediate solution |
| S11, S12, S25, S13, and S13' | 11, 12, 25, 13 and 13' | first lean liquid |
| S20, S10 and S21 | 20, 10, and 21 | second lean liquid |
| S20' | 20' | mixed lean liquid |

TABLE IV

Compositions (Rich or Lean) of the Multi-Component Working Fluid for SLT-4d

| Streams | Points | Richness/Leanness |
|---|---|---|
| S16, S17 and S18 | 16, 17 and 18 | first rich vapor |
| S15 | 15 | second rich vapor |
| S26, S1, S2, S3, and S8 | 26, 1, 2, 3 and 8 | rich solution |
| S6' | 6' | enriched intermediate solution |
| S22, S23, S24, S25, S9, S6, S5 and S7 | 22, 23, 24, 25, 9, 6, 5 and 7 | intermediate solution |
| S11, S12, S25, S13, and S13' | 11, 12, 25, 13 and 13' | first lean liquid |
| S20, S10 and S21 | 20, 10, and 21 | second lean liquid |

Both variants of the systems shown above provide an increase in the net output of the system. SLT-4c gives an increase in output of approximately 5.25% as compared to SLT-4b, while SLT-4d gives an increase in output of approximately 5.37% as compared to SLT-4b.

All references cited herein are incorporated by reference. Although the invention has been disclosed with reference to various embodiments, those of skill in the art may appreciate changes and modification that may be made which do not depart from the scope and spirit of this invention.

I claim:

1. A method for producing electrical and/or mechanical energy from a temperature different between warm surface seawater and cold seawater collected at depths up to 2 miles below the surface of an ocean or sea, where the method comprises:

passing a first rich vapor stream, which may be pressure adjusted in a third throttle control valve if needed, through a turbine unit, where a portion of thermal energy in the first rich vapor stream is converted to a useable form of energy to produce a spent rich solution stream, combining the spent rich solution stream with a cooled combined lean liquid stream, which may be pressure adjusted in a third throttle control valve if needed, to form an intermediate solution stream, where the intermediate solution stream is leaner than the rich solution stream, condensing the intermediate solution stream in a first condenser utilizing a cold seawater stream to form a fully condensed, intermediate solution stream to form a warmed cold seawater stream, pressurizing the fully condensed intermediate solution stream in a first pump to a higher pressure to form a higher pressure, fully condensed, intermediate stream, preheating the higher pressure, fully condensed, intermediate stream in a second preheater utilizing a combined stream to form a preheated, higher pressure, intermediate stream and the cooled combined stream, partially vaporizing the preheated, higher pressure, intermediate stream in a second partial vaporizer unit utilizing a second cooled warm seawater substream to form a partially vaporized, higher pressure, intermediate stream, separating the partially vaporized, higher pressure, intermediate stream in a second separator to form a second rich vapor stream and a second lean liquid stream, combining the second rich vapor stream with a second substream of a first lean liquid stream to form a rich solution stream, condensing the rich solution stream in a second condenser utilizing the warmed cold seawater stream to form a fully condensed, rich solution stream, pressurizing the fully condensed, rich solution stream in a second pump to a higher pressure to form a higher pressure, fully condensed, rich solution stream, meanwhile, preheating the higher pressure, fully condensed, rich solution stream in a first preheater utilizing a first cooled warm seawater substream to form a preheated, higher pressure, rich solution stream, partially vaporizing the preheated higher pressure, rich solution stream in a first partial vaporizer unit to form a partially vaporized, rich solution stream and a cooled warm seawater stream, dividing the cooled warm seawater stream into the first cooled warm seawater substream and the second cooled warm seawater substream, separating the partially vaporized, rich solution stream in a first separator to form the first rich vapor stream and a first lean liquid stream, dividing the first lean liquid stream into a first substream of the first lean liquid stream and the second substream of the first lean liquid stream, and combining the first substream of the first lean liquid stream with the second lean liquid stream to form the combined lean liquid stream, where all of the streams are derived from a multi-component working fluid and where the method is closed with respect to the multi-component working fluid.

2. The method of claim 1, wherein:

the rich vapor streams are richer than the rich solution streams, which is richer than the intermediate streams, which is richer than then lean solution stream, and which is richer than the lean liquid streams, a temperature differential between the warm seawater and the cold seawater is between about 15° C. and about 30° C., the useable form of energy is electrical and/or mechanical energy, and a net relative output compared to a Rankine cycle using pure ammonia is increased by at least about 25%.

3. The method of claim 2, wherein a net relative output compared to a Rankine cycle using pure ammonia is increased by at least about 35%.

4. The method of claim 2, wherein a net relative output compared to a Rankine cycle using pure ammonia is increased by at least about 45%.

5. The method of claim 2, wherein a net relative output compared to a Rankine cycle using pure ammonia is increased by at least about 55%.

6. A method for producing electrical and/or mechanical energy from a temperature different between warm surface seawater and cold seawater collected at depths up to 2 miles below the surface of an ocean or sea, where the method comprises:

passing a first rich vapor stream, which may be pressure adjusted in a third throttle control valve if needed, through a turbine unit, where a portion of thermal energy in the first rich vapor stream is converted to a useable form of energy to produce a spent rich solution stream, combining the spent rich solution stream with a cooled combined lean liquid stream, which may be pressure adjusted in a third throttle control valve if needed, to form an intermediate solution stream, where the intermediate solution stream is leaner than the rich solution stream, condensing the intermediate solution stream in a first condenser utilizing a cold seawater stream to form a fully condensed, intermediate solution stream to form a warmed cold seawater stream, pressurizing the fully condensed intermediate solution stream in a first pump to a higher pressure to form a higher pressure, fully condensed, intermediate stream, preheating the higher pressure, fully condensed, intermediate stream in a second preheater utilizing a combined stream to form a preheated, higher pressure, intermediate stream and the cooled combined stream, combining a first substream of a first lean liquid stream with the preheated, higher pressure, intermediated stream to form a higher pressure, lean stream, partially vaporizing the higher pressure, lean stream in a second partial vaporizer unit utilizing a second cooled warm seawater substream to form a partially vaporized, higher pressure, lean stream, separating the partially vaporized, higher pressure, lean stream in a second separator to form a second rich vapor stream and a second lean liquid stream, combining the second rich vapor stream with a second substream of a first lean liquid stream to form a rich solution stream, condensing the rich solution stream in a second condenser utilizing the warmed cold seawater stream to form a fully condensed, rich solution stream, pressurizing the fully condensed, rich solution stream in a second pump to a higher pressure to form a higher pressure, fully condensed, rich solution stream, meanwhile, preheating the higher pressure, fully condensed, rich solution stream in a first preheater utilizing a first cooled warm seawater substream to form a preheated, higher pressure, rich solution stream, partially vaporizing the preheated higher pressure, rich solution stream in a first partial vaporizer unit to form a partially vaporized, rich solution stream and a cooled warm seawater stream, dividing the cooled warm seawater stream into the first cooled warm seawater substream and the second cooled warm seawater substream, separating the partially vaporized, rich solution stream in a first separator to form the first rich vapor stream and a first lean liquid stream, dividing the first lean liquid stream into a first substream of the first lean liquid stream and the second substream of the first lean liquid stream, and combining the first substream of the first lean liquid stream with the second lean liquid stream to form the combined lean liquid stream, where all of the streams are derived from a multi-component working fluid and where the method is closed with respect to the multi-component working fluid.

7. The method of claim 6, wherein:

the rich vapor streams are richer than the rich solution streams, which is richer than the intermediate streams, which is richer than then lean solution stream, and which is richer than the lean liquid streams, a temperature differential between the warm seawater and the cold seawater is between about 15° C. and about 30° C., the useable form of energy is electrical and/or mechanical energy, and a net relative output compared to a Rankine cycle using pure ammonia is increased by at least about 25%.

8. The method of claim 7, wherein a net relative output compared to a Rankine cycle using pure ammonia is increased by at least about 35%.

9. The method of claim 7, wherein a net relative output compared to a Rankine cycle using pure ammonia is increased by at least about 45%.

10. The method of claim 7, wherein a net relative output compared to a Rankine cycle using pure ammonia is increased by at least about 55%.

11. A method for producing electrical and/or mechanical energy from a temperature different between warm surface seawater and cold seawater collected at depths up to 2 miles below the surface of an ocean or sea, where the method comprises:

passing a first rich vapor stream, which may be pressure adjusted in a third throttle control valve if needed, through a turbine unit, where a portion of thermal energy in the first rich vapor stream is converted to a useable form of energy to produce a spent rich solution stream, combining the spent rich solution stream with a cooled second lean liquid stream, which may be pressure adjusted in a third throttle control valve if needed, to form an intermediate solution stream, where the intermediate solution stream is leaner than the rich solution stream, condensing the intermediate solution stream in a first condenser utilizing a cold seawater stream to form a fully condensed, intermediate solution stream to form a warmed cold seawater stream, pressurizing the fully condensed intermediate solution stream in a first pump to a higher pressure to form a higher pressure, fully condensed intermediate stream, dividing the higher pressure, fully condensed intermediate stream into a first higher pressure, fully condensed intermediate substream and a second higher pressure, fully condensed intermediate substream, combining the first higher pressure, fully condensed intermediate substream with a second rich vapor stream to form a rich solution stream, condensing the rich solution stream in a second condenser utilizing the warmed cold seawater stream to form a fully condensed rich solution stream, pressurizing the fully condensed rich solution stream in a second pump to a higher pressure to form a higher pressure, fully condensed rich solution stream, preheating the higher pressure, fully condensed rich solution stream in a first preheater utilizing a first cooled warm seawater substream to form a preheated, higher pressure, rich solution stream, partially vaporizing the preheated higher pressure, rich solution stream in a first partial vaporizer unit to from a partially vaporized, rich solution stream and a cooled warm seawater stream, dividing the cooled warm seawater stream into the first cooled warm seawater substream and a second cooled warm seawater substream, separating the partially vaporized, rich solution stream in a first separator to form the first rich vapor stream and a first lean liquid stream, meanwhile, preheating the second higher pressure, fully condensed, intermediate substream in a second preheater utilizing the second lean liquid stream to form a preheated, second higher pressure, intermediate substream and the cooled second lean liquid stream, partially vaporizing the preheated, second higher pressure, intermediate substream in a second partial vaporizer unit utilizing the second cooled warm seawater substream to form a partially vaporized, second higher pressure, intermediate substream, combining the partially vaporized, second higher pressure, intermediate substream with the first lean liquid stream, which may be pressure adjusted by a first throttle control valve if needed, to form a lean solution stream, and separating the lean solution stream in a second separator to form the second rich vapor stream and the second lean liquid stream, where all of the streams are derived from a multi-component working fluid and where the method is closed with respect to the multi-component working fluid.

12. The method of claim 11, wherein all of the higher pressures are the same or different, wherein the rich vapor streams are richer than the rich solution streams, which is richer than the intermediate streams, which is richer than then lean solution stream, and which is richer than the lean liquid streams.

13. The method of claim 11, wherein a temperature differential between the warm seawater and the cold seawater is between about 15° C. and about 30° C.

14. The method of claim 11, wherein a net relative output compared to a Rankine cycle using pure ammonia is increased by at least about 20%.

15. The method of claim 11, wherein the useable form of energy is electrical and/or mechanical energy.

16. The method of claim 11, wherein a net relative output compared to a Rankine cycle using pure ammonia is increased by at least about 25%.

17. The method of claim 11, wherein a net relative output compared to a Rankine cycle using pure ammonia is increased by at least about 30%.

18. The method of claim 11, wherein a net relative output compared to a Rankine cycle using pure ammonia is increased by at least about 35%.

19. The method of claim 11, wherein a net relative output compared to a Rankine cycle using pure ammonia is increased by at least about 40%.

20. The method of claim 11, wherein a net relative output compared to a Rankine cycle using pure ammonia is increased by at least about 45%.

21. The method of claim 11, wherein a net relative output compared to a Rankine cycle using pure ammonia is increased by at least about 50%.

22. The method of claim 11, wherein a net relative output compared to a Rankine cycle using pure ammonia is increased by at least about 55%.

23. A thermal energy conversion system comprising:

a turbine or energy converting subsystem for converting a portion of thermal energy in a first rich vapor stream into a useable form of energy to from a spent stream, a condensing subsystem including:

a first condenser for condensing an intermediate solution stream comprising the spent stream and a cooled second lean liquid stream utilizing a higher pressure, cold seawater stream to form a fully condensed, intermediate solution stream, a first pump for pressurizing the fully condensed intermediate solution stream to a higher pressure to form a higher pressure, fully condensed, intermediate solution stream, a first dividing valve for dividing the higher pressure, fully condensed, intermediate solution stream into a first higher pressure, fully condensed, intermediate solution substream and a second higher pressure, fully condensed, intermediate solution substream, a second condenser for condensing a rich solution stream comprising the first fully condensed, higher pressure intermediate solution substream and a second rich vapor stream, and a second pump for pressurizing the fully condensed, rich solution stream to a higher pressure, a preheating subsystem including:

a first pre-heater or pre-heating heat exchange unit for preheating the second higher pressure, fully condensed, intermediate solution substream with thermal energy from a second lean liquid stream and a second pre-heater or pre-heating heat exchange unit for preheating the higher pressure, fully condensed, rich solution stream with thermal energy from a first cooled warm seawater substream, a partial vaporizing subsystem including:

a first partial vaporizing heat exchange unit for partially vaporizing the preheated, higher pressure, intermediate solution stream with thermal energy from a second cooled warm seawater substream, and a second partial vaporizing heat exchange unit for partially vaporizing the preheated, higher pressure, rich solution stream with thermal energy from a higher pressure warm seawater stream, and a separating subsystem including:

a first separator for separating the partially vaporized, higher pressure, rich solution stream into the first rich vapor stream and a first lean liquid stream and a second separator for separating a lean stream comprising the first lean liquid stream and the partially vaporized, higher pressure, intermediate solution stream into the second rich vapor stream and a second lean liquid stream, where all of the streams are derived from a multi-component working fluid and the system is closed with respect to the multi-component working fluid.

24. The system of claim 23, wherein the turbine or energy converting subsystem comprises a single stage turbine or a multi-stage turbine.

25. The system of claim 23, wherein the condensing subsystem comprises:

a first condenser (HE6) for condensing the intermediate solution stream comprising the spent rich solution stream and the cooled second lean liquid stream utilizing the higher pressure, cold seawater stream, a first pump (P2) for pressurizing the fully condensed intermediate solution stream to a higher pressure, a first dividing valve for dividing the higher pressure, fully condensed, intermediate solution stream into the first substream and the second substream, a second condenser (HE1) for condensing the rich solution stream comprising the first fully condensed, higher pressure intermediate solution substream and the second rich vapor stream, and a second pump (P1) for pressurizing the fully condensed, rich solution stream to a higher pressure.

26. The system of claim 23, wherein the preheating subsystem comprises:

a first preheater (HE5) for preheating the second fully condensed, higher pressure, intermediate solution substream with thermal energy from the second lean liquid stream and a second preheater (HE2) for preheating the higher pressure, fully condensed, rich solution stream with thermal energy from the first cooled warm seawater substream.

27. The system of claim 23, wherein the partial vaporizing subsystem comprises:

a first partial vaporizer (HE4) for partially vaporizing the preheated, higher pressure, intermediate solution stream with thermal energy from the second cooled warm seawater substream and a second partial vaporizer (HE2) for partially vaporizing the preheated, higher pressure, rich solution stream with thermal energy from the higher pressure warm seawater stream.

28. The system of claim 23, wherein the separating subsystem comprising:

a first separator (SP2) for separating the partially vaporized, higher pressure, intermediate solution stream into the first rich vapor stream and the first lean liquid stream and a second separator (SP1) for separating a lean stream comprising the first lean liquid stream and the partially vaporized, higher pressure, intermediate solution stream into the second rich vapor stream and the second lean liquid stream.

29. The system of claim 23, wherein the warm seawater supply subsystem collector collects warm seawater from at or with in 10 meters of the surface of the ocean or sea, where the warm seawater has a temperature between about 20° C. and about 30° C.

30. The system of claim 23, wherein the cold seawater supply subsystem collector collects cold seawater from a depth between about 0.5 and 1.5 miles below the surface of the ocean or sea having a temperature between about 1° C. and about 10° C.

31. The system of claim 23, wherein the multi-component working fluid comprises one or a plurality of lower boiling point components, lower boiling components, and one or a plurality of higher boiling point components, higher boiling components.

32. The system of claim 23, wherein the multi-component working comprises an ammonia-water mixture, a mixture of two or more hydrocarbons, a mixture of two or more freon, a mixture of hydrocarbons and freon.

33. The system of claim 23, wherein the multi-component working fluid comprises a mixture of water and ammonia.

34. A system for generating electrical and/or mechanical energy comprising:

a vessel or a floating platform, a warm seawater supply subsystem comprising a collector, piping and a warm seawater pump (P4), where the warm seawater supply subsystem collects warm seawater from an ocean or a sea and pressurizes it to form a higher pressure warm seawater stream, a warm seawater discharge subsystem comprising piping including an outlet for discharging spent warm seawater back into the ocean or sea, a cold seawater supply subsystem comprising a collector, piping and a cold seawater pump (P3), where the cold seawater supply subsystem collects cold seawater from a depth up to two miles below a surface of the ocean or sea, a cold seawater discharge subsystem comprises piping including an outlet for discharging spent cold seawater back into the ocean or sea, and a thermal energy conversion subsystem including:

a turbine or energy converting subsystem for converting a portion of thermal energy in a first rich vapor stream into a useable form of energy to from a spent stream, a condensing subsystem including:

a first condenser for condensing an intermediate solution stream comprising the spent stream and a cooled second lean liquid stream utilizing a higher pressure, cold seawater stream to form a fully condensed, intermediate solution stream, a first pump for pressurizing the fully condensed, intermediate solution stream to a higher pressure to form a higher pressure, fully condensed, intermediate solution stream, a first dividing valve for dividing the higher pressure, fully condensed, intermediate solution stream into a first higher pressure, fully condensed, intermediate solution substream and a second higher pressure, fully condensed, intermediate solution substream, a second condenser for condensing a rich solution stream comprising the first fully condensed, higher pressure intermediate solution substream and a second rich vapor stream, and a second pump for pressurizing the fully condensed, rich solution stream to a higher pressure to form a higher pressure, fully condensed, rich solution stream, a preheating subsystem including:
   a first pre-heater or pre-heating heat exchange unit for preheating the second fully condensed, higher pressure, intermediate solution substream with thermal energy from a second lean liquid stream to form a pre-heated, higher pressure, intermediate solution stream, and
   a second pre-heater or pre-heating heat exchange unit for preheating the higher pressure, fully condensed, rich solution stream with thermal energy from a first cooled warm seawater substream, a partial vaporizing subsystem including:
   a first partial vaporizing heat exchange unit for partially vaporizing the preheated, higher pressure, intermediate solution stream with thermal energy from a second cooled warm seawater substream, and
   a second partial vaporizing heat exchange unit for partially vaporizing the preheated, higher pressure, rich solution stream with thermal energy from a higher pressure warm seawater stream, and a separating subsystem including:
   a first separator for separating the partially vaporized, higher pressure, rich solution stream into the first rich vapor stream and a first lean liquid stream, and
   a second separator for separating a lean stream comprising the first lean liquid stream and the partially vaporized, higher pressure, intermediate solution stream into the second rich vapor stream and a second lean liquid stream, where all of the streams are derived from a multi-component working fluid and the thermal energy conversion subsystem is closed with respect to the multi-component working fluid.

35. The system of claim 1, wherein the warm seawater supply subsystem collector collects warm seawater from at or within 10 meters of the surface of the ocean or sea, where the warm seawater has a temperature between about 20° C. and about 30° C.

36. The system of claim 1, wherein the cold seawater supply subsystem collector collects cold seawater from a depth between about 0.5 and 1.5 miles below the surface of the ocean or sea having a temperature between about 1° C. and about 10° C.

37. The system of claim 1, wherein the multi-component working fluid comprises one or a plurality of lower boiling point components, lower boiling components, and one or a plurality of higher boiling point components, higher boiling components.

38. The system of claim 1, wherein the multi-component working comprises an ammonia-water mixture, a mixture of two or more hydrocarbons, a mixture of two or more freon, a mixture of hydrocarbons and freon.

39. The system of claim 1, wherein the multi-component working fluid comprises a mixture of water and ammonia.

* * * * *